3,076,798
PROCESS FOR PREPARING A FERRIC HYDROX-
IDE POLYMALTOSE COMPLEX
Arthur Mueller, Heinrich Schwarz, and Theodore Bersin,
Sankt Gallen, Switzerland, assignors to Hausmann
Laboratories Ltd., Gallen, Switzerland, a company
No Drawing. Filed Feb. 23, 1961, Ser. No. 90,952
9 Claims. (Cl. 260—209)

This invention relates to a process of producing a new iron injection preparation which is suitable for parenteral medication for the treatment of iron deficiency anemia in humans and animals.

It is known that ferric hydroxide-carbohydrate complexes can be produced by reacting suitable carbohydrates in a solution or suspension with ferric hydroxide or ferric salts and excess alkali. (United States Patent No. 2,820,-740; Austrian Patent No. 199,794; Austrian Patent No. 204,180.) Likewise, dextrans (polyisomaltoses) and ferrous salts and alkali can be converted into ferrous hydroxide-polyisomaltose complexes, these can be converted by oxidation into the corresponding ferric hydroxide complex. (See Austrian Patent No. 208,003.) Furthermore, it is known that by heating of an aqueous solution of dextran together with a water soluble ferric salt and alkali at a pH of about 2.3 a precipitable iron complex results which can be depolymerized by hydrolysis to the molecular size desired, and, following this, can be converted by treatment with excess alkali into an iron dextran complex, or, if necessary, can be subjected without depolymerization to the treatment with alkali directly. (See United States Patent No. 2,885,393.) Solutions of such ferric hydroxide-carbohydrate complexes should conform to the following standards: Ability of rapid resorption, low toxicity, high tolerancy, high iron content, preferably solutions with 5 to 10% elementary iron, high thermal stability, good stability on storage and easy utilization for hemoglobin synthesis.

As the known solutions of so-called "saccharated oxide of iron" are stable exclusively under alkaline conditions they can be used for intravenous injections only, but not for intramuscular ones. On the other hand the ferric hydroxide-inulin complexes, as well as the ferric hydroxide-polyisomaltose complexes (iron-dextran complexes) can be used for intramuscular application in the form of neutral, isotonic solutions. Solutions of the ferric hydroxide-inulin complexes are not satisfactory in regard to thermal and storage stability, and some of the expensive ferric hydroxide-polyisomaltose complexes are not fully satisfactory in regard to good tolerancy. (See G. Hemmeler, Med. Hyg., 15 (1957), 359:183, Haddow A. and Horning E. S., J. Nat. Cancer Inst., 24, 106, 1960.) After injection of these preparations the carbohydrate part leaves the body almost unchanged as the enzyme necessary for the degradation of inulin or polyisomaltose is practically missing. Whereas, the ferric dextran preparations are well tolerated only in intramuscular application, the ferric hydroxide-polymaltose complex produced according to this invention is suitable for intramuscular as well as intravenous medication.

Of the ferric hydroxide-polymaltose preparations (ferric hydroxide-dextrin complexes) known up to date, none conform with the above-mentioned standards required for a good intramuscular applicable iron injection preparation. These solutions contain only about 2% iron and are therefore unsuitable for the intramuscular application owing to the large volume of the solution necessary for medication. (See Lucas et al., "Blood," vol. 7, pages 358–367, 1952.) The efficiency for the complexing of iron hydroxide of the dextrins increases as we established, with the decrease of the molecular weight of the carbohydrate ligand. On the other hand, the complex stability of ferric hydroxide-carbohydrate complexes decreases with a low molecular ligand component whereby the thermal stability and shelf life of the preparations are affected adversely.

According to this invention these disadvantages are eliminated by depolymerizing dextrin by means of methods known in the present state of the art, for example, by means of acid hydrolysis and fractionating by precipitation with solvents soluble in water, like alcohols and acetone, and from the resulting polymaltose fractions forming ferric hydroxide complexes having high iron content and good thermal stability. These complexes are formed by contacting a water-soluble, non-retrograding dextrin with an aqueous solution containing ferric ions and an excess of an alkali-hydroxide or an alkali carbonate and heating the reaction mixture.

Polymaltose fractions obtained by depolymerizing dextrins having an intrinsic viscosity $[\eta]$ of 0.025 to 0.075 at 25° C. are suitable for the process according to this invention. Polymaltose fractions with lower intrinsic viscosity result in ferric hydroxide complexes of higher iron content. They are, however, useless for therapeutical application due to the lower complex stability resulting in bad tolerancy, thermal stability and unfavorable shelf-like properties. On the other hand, polymaltose fractions having an intrinsic viscosity $[\eta]$ of more than 0.75 at 25° C. result in stable complexes of good stability on storage. However, the iron content of these solutions is too low to obtain the high iron concentration necessary in a volume small enough to be applicable for intramuscular medication.

For the production of ferric hydroxide-polymaltose complexes according to this invention, bivalent as well as trivalent iron compounds can be brought to reaction with suitable polymaltose fractions and alkali hydroxide or alkali carbonate in excess. The ferrous hydroxide-polymaltose complex resulting from the reaction with bivalent iron compounds will be oxidized to the corresponding ferric complex. As an oxidizing agent, for example, pure oxygen or atmospheric oxygen can be used. Any ferric or ferrous compounds which will ionize in solution may be used in the practice of this invention. Examples of such compounds include ferric chloride, ferric hydroxide, ferric nitrate, ferric sulphate, ferric acetate, ferrous sulfate, etc. As examples of alkali hydroxides and alkali carbonates which may be used in the practice of this invention there may be mentioned sodium hydroxide, potassium hydroxide, lithium hydroxide, ammonium hydroxide, sodium carbonate, potassium carbonate, lithium carbonate and ammonium carbonate. Sodium hydroxide is the preferred material.

The ferric hydroxide-polymaltose complex is formed by heating the mixture of a water-soluble dextrin and an aqueous solution containing ferric ions and an excess of an alkali hydroxide or an alkali carbonate to a temperature of from 60 to 100° C. and preferably 70 to 75° C. It is preferred to use from about 5 to 9 grams, and preferably 7 grams, of the dextrin fraction, with an amount of ferric compound corresponding to 1 gram of elemental iron or an amount of ferrous compound corresponding to 2 grams of elemental iron. A molar excess of alkali hydroxide or alkali carbonate is used over the amount theoretically required to accomplish the reaction. For example, from 65 to 120 ml. and preferably 70 to 80 ml. of 10 N sodium hydroxide or of a 25 percent by weight aqueous solution of sodium carbonate may be used with an amount of ferric compound corresponding to 10 grams of elemental iron or an amount of ferrous compound corresponding to 20 grams of elemental iron.

The alkaline ferric hydroxide-polymaltose solution, before being isolated and purified, can be neutralized with addition of a solid, liquid, or gaseous acid, as for example an acid cation exchanger, sulfuric acid, or hydrochloric acid. In order to get the solution free of electrolytes an alkaline anion exchanger can be added in addition besides the cation exchanger; or the solution can be dialysed against water. Good water soluble preparations in powder form are obtained according to the well known processes by evaporation under reduced pressure of the neutral solutions or by precipitation with an appropriate water soluble solvent.

The preparation produced according to this invention, is a water soluble, light brown, non-hygroscopic powder, containing about 15 to 25% iron and about 70 to 50% polymaltose. The highly purified ferric hydroxide-polymaltose complex is characterized by the ratio between iron and the dextrin as anhydroglucose units $(C_6H_{10}O_5)$ = minimally 2 moles of Fe for each anhydroglucose unit. If HCl is added to the aqueous solution of a substance of this invention at room temperature, drop by drop, while stirring, no cloudiness occurs up to pH=1. In the electrophoresis the spherical colloid ferric hydroxide-polymaltose moves slightly cathodic in acetate buffer of pH 5.0.

The ferric hydroxide-polymaltose complexes produced according to this invention are extremely valuable therapeutic agents for hemoglobin synthesis—i.e., in the treatment of iron deficiency anemia in humans or in animals. Since the complex is soluble in water, an aqueous solution of it can be injected either intramuscularly or intravenously. Further, it may be administered by adding it to salt or sugar infusions. When the complex is administered by any of the above described means, it is well-tolerated without the onset of undesirable local or general side effects. The dosage to be used will depend on the iron or hemoglobin deficiency which is to be treated. Normally, a dosage corresponding to 100 mg. elemental iron is administered every second day until the hemoglobin deficiency is corrected. When the complex is administered as an additive to salt or sugar infusions, doses of up to 2000 mg. of iron can be tolerated although it is preferred to limit the aggregate dosage administered by this method to from 250 to 1000 mg. of iron. Aqueous solutions of the complex are very stable.

*Example 1*

Seventy grams of a dextrin fraction having an intrinsic viscosity at 25° C. of $[\eta]=0.050$ are dissolved in 300 ml. of distilled water while being heated. Into the solution, heated to 65° C., 180 grams of ferric hydroxide which has been precipitated freshly and washed free of electrolytes, corresponding to 10 grams elemental iron, were added with vigorous stirring. Following this, 45 ml. 10 N NaOH are given to the suspension. The reaction temperature of the well stirred mixture is kept at 65° to 70° C. for 30 minutes, whereas the ferric hydroxide is dissolving completely. The cooled reaction mixture is adjusted to a pH of 6.5 by means of 2 N hydrochloric acid; the ferric hydroxide-polymaltose complex is precipitated in the ratio of 1 part by volume of solution to 2 parts by volume of 99 percent methyl alcohol; the precipitate is dried in the vacuum. The precipitate can be processed to an aqueous solution which is practically isotonic, neutral and sterile and which has an iron content of 5%.

*Example 2*

Thirty-five grams of a dextrin fraction having an intrinsic viscosity at 25° C. of $[\eta]=0.055$ are dissolved in 100 ml. distilled water while being heated. Into the solution, heated to 75° C. 75 grams of a solution of ferric chloride (25 g. FeCl$_3$.6H$_2$O dissolved in 50 grams distilled water) is added at the same temperature then while stirring vigorously, 45 ml. 10 N sodium hydroxide solution is added slowly. After allowing the reaction to proceed for 15 minutes at a temperature of 75° C. the solution is cooled and centrifuged to separate undissolved matter. The solution is then adjusted to a pH of 6.2 with 90 ml. of a strongly acidic cation exchanger and 20 ml. strongly alkaline anion exchanger. The filtrate separated from the exchangers is mixed in the ratio of 1 part by volume of solution to 2.5 parts by volume of 96 percent ethyl alcohol and the resulting supernatant solution is separated from the precipitated ferric hydroxide-carbohydrate complex. The precipitate is dissoved in 100 ml. distilled water free of pyrogens. The alcohol remaining is removed by evaporation in vacuum and the solution is readjusted to have an iron content of up to 10 percent. By addition of NaCl the solution is made isotonic and the solution then being practically neutral is filled into ampoules and is sterilized for 30 minutes in flowing steam. If the solution is filled into multiple dose containers, 0.5% phenol as a preservative can be added without adverse effect.

*Example 3*

Thirty-five grams of a dextrin fraction having an intrinsic viscosity at 25° C. of $[\eta]=0.045$ are dissolved in 75 ml. distilled water while being heated. Into this solution heated at 65° C., 50 grams FeSO$_4$.7H$_2$O are dissolved; the solution is then poured into 75 ml. of warm water. Following this, 55 ml. 10 N sodium hydroxide solution is added slowly while stirring vigorously. After allowing the reaction to proceed for 30 minutes at a temperature of 65° C., the solution is cooled and centrifuged to separate undissolved matter. Following this, the solution is dialyzed against well aired, flowing and demineralized water until there is a neutral reaction and no trace of sulfate ions. The solution which has been obtained in this way is evaporated under lowered pressure at a temperature of 40° C. until the solution has an iron content of 5%. By addition of NaCl the solution is made isotonic; then, the solution is filled into ampoules and is sterilized for 30 minutes in flowing steam.

*Example 4*

One hundred forty grams of a dextrin fraction having an intrinsic viscosity at 25° C. of $[\eta]=0.070$ are dissolved with heat in 400 ml. demineralized water. The solution is mixed with 300 grams of a solution of ferric chloride (100 grams FeCl$_3$.6HOH dissolved in 200 grams demineralized water). The mixture is adjusted to a pH of about 2.4 by means of a solution of sodium carbonate and is heated to a temperature of about 70° C. Then, 45 ml. 10 N NaOH are added. The mixture is left to react for 30 minutes at a temperature of 70° C. The cooled reaction product is processed to a solid preparation according to Example 1.

*Example 5*

Seventy grams of a dextrin fraction having an intrinsic viscosity at 25° C. of $[\eta]=0.055$ are dissolved in 200 ml. distilled water while being heated. This solution is mixed with 150 grams of a solution of ferric chloride (50 grams FeCl$_3$.6H$_2$O). Into this mixture heated at 65° C. a solution of 50 grams of anhydrous sodium carbonate in 200 ml. of water is slowly added while stirring vigorously. After allowing the reaction to proceed for 30 minutes at a temperature of 70° C., the solution is cooled and centrifuged to separate undissolved matter and processed to a solid preparation according to Example 1.

This application is a continuation-in-part of our copending U.S. application Serial No. 26,681, filed May 4, 1960, now abandoned.

We claim:

1. A process of producing a therapeutically useful ferric hydroxide-polymaltose complex which comprises mixing an aqueous medium of a water-soluble non-retrograding dextrin having an average intrinsic viscosity at 25° C. of from about 0.025 to 0.075 with an aqueous solution containing ferric ions and an excess of a member selected from the group consisting of alkali hydroxides and alkali carbonates and heating the reaction mixture to a temperature of from 60 to 100° C. to form a ferric hydroxide-polymaltose complex and recovering said complex.

2. The process of claim 1 wherein said reaction mixture is heated to a temperature of from 70 to 75° C.

3. The process of claim 1 wherein ferric hydroxide is formed in said aqueous medium of said water-soluble dextrin by adding a ferric compound and an alkali hydroxide to said aqueous medium.

4. The process of claim 1 wherein a water-washed, freshly precipitated ferric hydroxide is added to said soluble dextrin.

5. The process of claim 1 wherein ferrous hydroxide is formed in said aqueous medium of said water-soluble dextrin by adding a ferrous compound and an alkali hydroxide to said aqueous medium to form a ferrous hydroxide-polymaltose complex, oxidizing said complex to the ferric state and recovering the ferric hydroxide-polymaltose complex thus formed.

6. The process of claim 1 wherein said aqueous medium containing a ferric hydroxide-polymaltose complex is brought into contact with an ion exchange composition to render said complex isotonic before recovering said complex.

7. The process of claim 1 wherein said aqueous medium containing a ferric hydroxide-polymaltose complex is dialyzed to remove the alkali from said medium before recovering said complex.

8. The process of producing a therapeutically useful ferric hydroxide-polymaltose complex which comprises mixing an aqueous medium of a water-soluble, nonretrograding dextrin having an intrinsic viscosity of 0.025 to 0.075 at 25° C. with a member selected from the group consisting of ferric and ferrous compounds and a member selected from the group consisting of alkali hydroxides and alkali carbonates and heating the mixture to a temperature of from 60 to 100° C. to form a member selected from the group consisting of ferric and ferrous hydroxide-polymaltose complexes in said aqueous medium, adjusting the aqueous medium to pH 6–7, oxidizing said ferrous hydroxide-polymaltose complex to the ferric state and recovering ferric hydroxide-polymaltose complex.

9. A therapeutically useful pure ferric hydroxide-polymaltose complex produced by the process of claim 1.

References Cited in the file of this patent

UNITED STATES PATENTS

| | | |
|---|---|---|
| 2,518,135 | Gaver | Aug. 8, 1950 |
| 2,820,740 | London et al. | Jan. 21, 1958 |
| 2,885,393 | Herb | May 5, 1959 |

OTHER REFERENCES

Bastisse: Chemical Abstracts, vol. 44, 1950, p. 5527g.